(12) United States Patent
Mizuhata et al.

(10) Patent No.: US 8,211,608 B2
(45) Date of Patent: Jul. 3, 2012

(54) METHOD FOR PRODUCTION OF RESIN EMULSION

(75) Inventors: Hiroshi Mizuhata, Wakayama (JP);
Nobumichi Kamiyoshi, Wakayama (JP);
Shinichi Sata, Wakayama (JP)

(73) Assignee: Kao Corporation, Tokyo (JP)

( * ) Notice: Subject to any disclaimer, the term of this patent is extended or adjusted under 35 U.S.C. 154(b) by 311 days.

(21) Appl. No.: 12/595,962

(22) PCT Filed: Apr. 17, 2008

(86) PCT No.: PCT/JP2008/057484
§ 371 (c)(1),
(2), (4) Date: Oct. 15, 2009

(87) PCT Pub. No.: WO2008/133166
PCT Pub. Date: Nov. 6, 2008

(65) Prior Publication Data
US 2010/0136470 A1   Jun. 3, 2010

(30) Foreign Application Priority Data

Apr. 20, 2007   (JP) .................................. 2007-111268

(51) Int. Cl.
G03G 9/00   (2006.01)
(52) U.S. Cl. ............. 430/108.4; 430/109.4; 430/137.14; 524/599
(58) Field of Classification Search ............... 430/108.4, 430/109.4, 137.14; 524/599
See application file for complete search history.

(56) References Cited

U.S. PATENT DOCUMENTS
2006/0051693 A1   3/2006   Sata et al.
2007/0088119 A1   4/2007   Kamiyoshi et al.
2007/0128533 A1   6/2007   Sata et al.
2008/0026311 A1   1/2008   Mizuhata et al.

FOREIGN PATENT DOCUMENTS
CN   1949090 A   4/2007
(Continued)

OTHER PUBLICATIONS
U.S. Appl. No. 12/525,834, filed Aug. 5, 2009, Mizuhata, et al.
(Continued)

*Primary Examiner* — Mark A Chapman
(74) *Attorney, Agent, or Firm* — Oblon, Spivak, McClelland, Maier & Neustadt, L.L.P.

(57) ABSTRACT

The present invention relates to a resin emulsion which has a good emulsification performance even when produced by using a crosslinked polyester resin as a binder resin, and also is capable of producing a toner having an excellent storage property therefrom; and a process for producing the resin emulsion. The process for producing a resin emulsion according to the present invention, includes the steps of: (a) mixing a resin containing a polyester having at least one constitutional unit selected from the group consisting of a constitutional unit derived from a trivalent or higher-valent alcohol component and a constitutional unit derived from a trivalent or higher-valent carboxylic acid component, an anionic surfactant, a nonionic surfactant and an aqueous medium with each other at a temperature not lower than a softening temperature (Ts) of the resin as measured by a flow tester method, the nonionic surfactant and the aqueous medium being used in amounts of from 0.1 to 1.0 part by weight and from 10 to 50 parts by weight, respectively, on the basis of 100 parts by weight of the resin; and (b) neutralizing a mixture obtained in the step (a) with a basic compound in an aqueous medium at a temperature not higher than a softening point (T1/2) of the resin as measured by a flow tester method.

19 Claims, 1 Drawing Sheet

FOREIGN PATENT DOCUMENTS

| | | |
|---|---|---|
| JP | 6 19204 | 1/1994 |
| JP | 2002 037891 | 2/2002 |
| JP | 2002 226819 | 8/2002 |
| JP | 2003 253102 | 9/2003 |
| JP | 2004 051806 | 2/2004 |
| JP | 2006 106679 | 4/2006 |
| JP | 2007 106906 | 4/2007 |
| JP | 2008 115333 | 5/2008 |

OTHER PUBLICATIONS

Office Action issued Mar. 23, 2011 in Chinese Patent Application No. 200880012358.9 (English translation only).

Office Action issued Aug. 31, 2011, in Chinese Patent Application No. 200880012358.9 (with English-language translation).

Office Action issued Jan. 31, 2012, in corresponding Chinese Patent Application No. 200880012358.9 (with English-language translation).

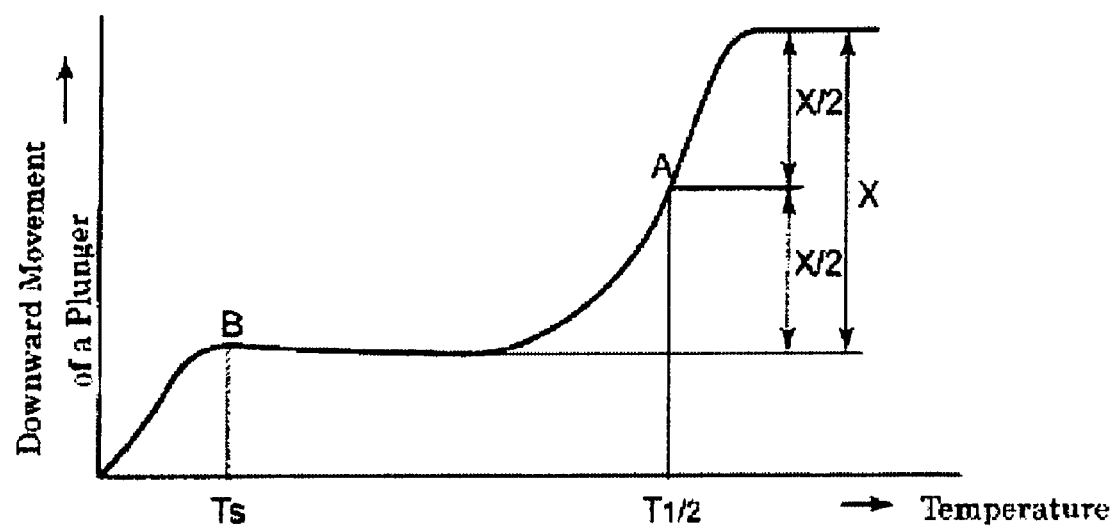

METHOD FOR PRODUCTION OF RESIN EMULSION

TECHNICAL FIELD

The present invention relates to a resin emulsion, a process for producing the resin emulsion, a toner for electrophotography obtained by using the process, and a process for producing the toner.

BACKGROUND ART

In the field of toners for electrophotography, it has been demanded to develop toners having a smaller particle size and an excellent fusing ability in view of achieving higher image qualities. Conventional processes for producing the toners include a melt-kneading and pulverization method, and a wet process such as an emulsification and aggregation method. In these methods, binder resins, for example, those composed mainly of a polyester, are used to obtain toner particles from the viewpoint of a good fusing ability thereof.

Conventionally, in some kinds of polyesters as the binder resin, a trivalent carboxylic acid such as trimellitic acid has been used as an acid monomer component thereof from the viewpoints of a good fusing ability and a good durability of the resulting toner. For example, Patent Document 1 discloses a toner obtained by using a polyester resin containing an aromatic dicarboxylic acid component such as isophthalic acid and terephthalic acid, an aromatic tricarboxylic acid component such as trimellitic acid or an aliphatic dicarboxylic acid component such as dodecenylsuccinic acid as a constitutional unit thereof.

In addition, as the method for producing the toner having a small particle size, there has been proposed, for example, a method for producing a toner for electrophotography containing a binder resin and a colorant which includes the step of forming the binder resin into fine particles having a volume-median particle size ($D_{50}$) of from 0.05 to 3 μm in an aqueous medium in the presence of a nonionic surfactant at a temperature ranging from a temperature lower by 10° C. than a cloud point of the nonionic surfactant to a temperature higher by 10° C. than the cloud point (for example, refer to Patent Document 2).

Patent Document 1: JP 6-19204A
Patent Document 2: JP 2006-106679A

DISCLOSURE OF THE INVENTION

Problem to be Solved by the Invention

However, when it is intended to produce a toner using a crosslinked polyester resin obtained from the aromatic tricarboxylic acid such as trimellitic acid by the above emulsification and aggregation method, it is not easy to prepare a resin emulsion containing fine resin particles by emulsification, and even if the resin is emulsified, emulsified particles contained in the thus obtained resin emulsion tend to have a relatively low molecular weight. As a result, the toner produced from such emulsified particles tends to suffer from problems such as deteriorated fusing ability, in particular, poor high-temperature anti-offset property and insufficient storage property under a high-temperature condition.

On the other hand, in the technique described in Patent Document 2, although the toner having a small particle size is obtained, it has been still required that the resulting toner is further improved in a heat-resistant storage property, etc.

In consequence, the present invention relates to a resin emulsion exhibiting a good emulsification performance even when using the crosslinked polyester resin as a resin binder, and also being capable of providing a toner having an excellent heat-resistant storage property; a process for producing the resin emulsion; a toner for electrophotography obtained by using the process for producing the resin emulsion; and a process for producing the toner.

Means for Solving Problem

Thus, the present invention relates to:
(1) A process for producing a resin emulsion, including the steps of:
 (a) mixing a resin containing a polyester having at least one constitutional unit selected from the group consisting of a constitutional unit derived from a trivalent or higher-valent alcohol component and a constitutional unit derived from a trivalent or higher-valent carboxylic acid component, an anionic surfactant, a nonionic surfactant and an aqueous medium with each other at a temperature not lower than a softening temperature (Ts) of the resin as measured by a flow tester method, the nonionic surfactant and the aqueous medium being used in amounts of from 0.1 to 1.0 part by weight and from 10 to 50 parts by weight, respectively, on the basis of 100 parts by weight of the resin; and
 (b) neutralizing a mixture obtained in the step (a) with a basic compound in an aqueous medium at a temperature not higher than a softening point (T1/2) of the resin as measured by a flow tester method.
(2) A resin emulsion produced by the process as defined in the above (1).
(3) A resin emulsion including a binder resin containing a polyester having at least one constitutional unit selected from the group consisting of a constitutional unit derived from a trivalent or higher-valent alcohol component and a constitutional unit derived from a trivalent or higher-valent carboxylic acid component, a nonionic surfactant, an anionic surfactant and an aqueous medium, wherein emulsified particles contained in the resin emulsion have a softening point (T1/2) of from 105 to 155° C. as measured by a flow tester method, and a content of the nonionic surfactant in the resin emulsion is from 0.1 to 1.0 part by weight on the basis of 100 parts by weight of the binder resin.
(4) A resin emulsion produced by emulsifying a binder resin containing a polyester having at least one constitutional unit selected from the group consisting of a constitutional unit derived from a trivalent or higher-valent alcohol component and a constitutional unit derived from a trivalent or higher-valent carboxylic acid component, in an aqueous medium in the presence of a nonionic surfactant and an anionic surfactant, wherein emulsified particles contained in the resin emulsion have a softening point (T1/2) of from 105 to 155° C. as measured by a flow tester method, and a content of the nonionic surfactant in the resin emulsion is from 0.1 to 1.0 part by weight on the basis of 100 parts by weight of the binder resin.
(5) A process for producing a toner for electrophotography, including the steps of:
 (1) producing a resin emulsion by the process as defined in the above (1); and
 (2) aggregating and coalescing emulsified particles contained in the resin emulsion obtained in the step (1).

(6) A toner for electrophotography produced by the process as defined in the above (5).

Effect of the Invention

In accordance with the present invention, there are provided a resin emulsion which has a good emulsification performance even when produced by using a crosslinked polyester resin as a binder resin, and also is capable of producing a toner having an excellent heat-resistant storage property; a process for producing the resin emulsion; a toner for electrophotography produced by using the production process; and a process for producing the toner.

BEST MODE FOR CARRYING OUT THE INVENTION

[Resin Emulsion]

The resin emulsion according to the present invention includes a binder resin containing a polyester having at least one constitutional unit selected from the group consisting of a constitutional unit derived from a trivalent or higher-valent alcohol component and a constitutional unit derived from a trivalent or higher-valent carboxylic acid component, a nonionic surfactant and an anionic surfactant, wherein emulsified particles contained in the resin emulsion have a softening point (T1/2) as measured by a flow tester method (hereinafter referred to merely as "softening point T1/2") of from 105 to 155° C., and a content of the nonionic surfactant in the resin emulsion is from 0.1 to 1.0 part by weight on the basis of 100 parts by weight of the binder resin.

The resin emulsion according to the present invention is produced by emulsifying a binder resin containing a polyester having at least one constitutional unit selected from the group consisting of a constitutional unit derived from a trivalent or higher-valent alcohol component and a constitutional unit derived from a trivalent or higher-valent carboxylic acid component, in an aqueous medium in the presence of a nonionic surfactant and an anionic surfactant, wherein emulsified particles contained in the resin emulsion have a softening point (T1/2) of from 105 to 155° C. as measured by a flow tester method, and a content of the nonionic surfactant in the resin emulsion is from 0.1 to 1.0 part by weight on the basis of 100 parts by weight of the binder resin.

One feature of the resin emulsion of the present invention resides in that the resin emulsion is obtained by emulsifying the resin in the presence of a small amount of the nonionic surfactant, the anionic surfactant and the aqueous medium. In the case of the conventional resin emulsions, in order to emulsify the resin, it is necessary to use a large amount of the nonionic surfactant, so that a large amount of the surfactant tends to remain in the resulting resin emulsion. In this case, if the resin particles are not fully washed upon production of a toner, a large amount of the surfactant also tends to remain in the resulting toner, thereby causing such a risk that the residual surfactant gives adverse influence on a performance of the toner. On the other hand, according to the present invention, since the resin is neutralized after dispersing the resin in the aqueous medium, the neutralization treatment can be performed in an efficient manner. Therefore, it is considered that the resin can be readily emulsified even when the surfactant is used in a smaller amount than conventionally, thereby attaining such an effect that the amount of the surfactant remaining in the resin emulsion, in particular, in the toner can be reduced. As a result, it is considered that emulsified particles contained in the resin emulsion have a high softening point and a high glass transition point, and the toner obtained therefrom, therefore, also have a high softening point and a high glass transition point.

FIG. 1 is a view showing a relationship between a temperature and a downward movement of a plunger of a flow tester when a sample is extruded through a nozzle using the flow tester while heating by applying a load thereto with the plunger. The term "softening point T1/2" as used herein means the temperature at which a half amount of the sample is flowed out in the above measurement method using the flow tester, and indicates the temperature T1/2 at the point A shown in FIG. 1.

Polyester-Containing Binder Resin

The binder resin used in the resin emulsion of the present invention contains a polyester from the viewpoints of a good heat-resistant storage property, a good fusing ability and a good durability of the resulting toner. The content of the polyester in the binder resin is preferably 60% by weight or more, more preferably 70% by weight or more, even more preferably 80% by weight or more and further even more preferably substantially 100% by weight from the viewpoints of a good fusing ability and a good durability of the resulting toner. Examples of resins other than the polyester which may be contained in the binder resin include known resins conventionally used for toners such as styrene-acryl copolymers, epoxy resins, polycarbonates and polyurethanes.

Meanwhile, in the present invention, as the polyester, there may be used not only unmodified polyesters but also modified polyesters obtained by modifying polyesters to such an extent that the polyesters are substantially free from deterioration in inherent properties thereof. Examples of the modified polyesters include polyesters grafted or blocked with phenol, urethane, epoxy, etc., by the methods described, for example, in JP 11-133668A, JP 10-239903A and JP 8-20636A, and composite resins containing two or more kinds of resin units including a polyester unit.

Further, from the viewpoints of a good fusing ability and a good durability of the toner, the above binder resin may contain two or more kinds of polyesters which are different in softening point from each other. When the binder resin contains two kinds of polyesters, one polyester (a) preferably has a softening point (T1/2) of not lower than 70° C. but lower than 115° C., and the other polyester (b) preferably has a softening point (T1/2) of not lower than 115 but not higher than 165° C.

The weight ratio of the polyester (a) to the polyester (b) (a/b) in the binder resin is preferably from 10/90 to 90/10.

In the present invention, from the viewpoints of a good heat-resistant storage property, a good durability, a good fusing ability and a good gloss of the resulting toner, the polyester has a constitutional unit derived from a trivalent or higher-valent alcohol component and/or a trivalent or higher-valent carboxylic acid component.

The total content of the trivalent or higher-valent carboxylic acid component and the trivalent or higher-valent alcohol component in whole raw material components is preferably from 2 to 25 mol %, more preferably from 3 to 21 mol %, even more preferably from 3.5 to 17 mol % and further even more preferably from 4 to 13 mol % on the basis of the whole components from the viewpoints of a good gloss and a good image density of the resulting printed images as well as a good durability of the resulting toner. In the present invention, the constitutional unit derived from the trivalent or higher-valent carboxylic acid component and/or the constitutional unit derived from the trivalent or higher-valent alcohol component can be obtained by using a trivalent or higher-valent carboxylic acid component and/or a trivalent or higher-valent alcohol component as raw components for production of the polyester. The content of the constitutional unit derived from the trivalent or higher-valent carboxylic acid component and/or the constitutional unit derived from the trivalent or higher-valent alcohol component in the polyester is the same as that of the trivalent or higher-valent carboxylic acid component and/or the trivalent or higher-valent alcohol component in the whole raw material components as described above. Meanwhile, in the case where two or more kinds of polyesters are used in combination with each other, the content of the trivalent or higher-valent carboxylic acid component and/or the trivalent or higher-valent alcohol component in the whole raw monomer components used for the two or more kinds of polyesters may fall within the above-specified range.

The trivalent or higher-valent carboxylic acid component and/or the trivalent or higher-valent alcohol component used in the present invention are not particularly limited, and preferably selected from those which function as a crosslinking agent when producing the polyester by reacting the alcohol component with the acid component. Specific examples of the trivalent or higher-valent carboxylic acid component include trimellitic acid, pyromellitic acid and anhydrides or alkyl ($C_1$ to $C_3$) esters of these acids. Specific examples of the trivalent or higher-valent alcohol component include glycerol, pentaerythritol, trimethylol propane, sorbitol, and alkylene ($C_2$ to $C_4$) oxide adducts (average molar number of addition of alkyleneoxides: 1 to 16) of these alcohols. These trivalent or higher-valent carboxylic acid components and trivalent or higher-valent carboxylic acid components may be respectively used in combination of any two or more thereof.

In the present invention, among these trivalent or higher-valent carboxylic acid components and trivalent or higher-valent alcohol components, from the viewpoints of well-controlled molecular weight of the binder resin contained in the resin particles and a good storage property and a good fusing ability of the resulting toner, preferred are a trivalent carboxylic acid component and/or a trivalent alcohol component. Among them, trimellitic acid is more preferred as the trivalent carboxylic acid component, and glycerol and trimethylol propane are more preferred as the trivalent alcohol component. Among these components, from the viewpoints of a good fusing ability and a good durability of the resulting toner, even more preferred is trimellitic acid.

The presence or non-presence of any of the trivalent or higher-valent carboxylic acid component such as trimellitic acid and the trivalent or higher-valent alcohol component in the resin emulsion or the toner may be detected by a suitable analyzing method such as $^1$H-NMR. More specifically, when trimellitic acid is present in the resin emulsion or the toner, the presence of trimellitic acid may be determined by observation of a corresponding signal in chemical shift ranging from 8.2 to 8.4 ppm when measured in a deuterated chloroform extract thereof.

The content of the trivalent or higher-valent carboxylic acid component in whole acid components is preferably from 6 to 35 mol %. When the content of the trivalent or higher-valent carboxylic acid component is 6 mol % or more, the effect of adding the trivalent or higher-valent carboxylic acid component can be suitably exhibited so that a crosslinked resin having a desired softening point or a desired high-molecular weight moiety can be readily obtained. When the content of the trivalent or higher-valent carboxylic acid component is 35 mol % or less, occurrence of excessively high-density crosslinking can be prevented, so that the toner produced by using the resulting polyester can be inhibited from being deteriorated in low-temperature fusing ability. From the same viewpoints as described above, the content of the trivalent or higher-valent carboxylic acid component in whole acid components is more preferably from 6.5 to 32 mol % and even more preferably from 7 to 30 mol %.

The content of the trivalent or higher-valent alcohol component in whole alcohol components is preferably from 5 to 35 mol %. When the content of the trivalent or higher-valent alcohol component is 5 mol % or more, the effect of adding the trivalent or higher-valent alcohol component can be suitably exhibited, so that a crosslinked resin having a desired softening point and a desired high-molecular weight moiety can be obtained. When the content of the trivalent or higher-valent alcohol component is 35 mol % or less, occurrence of excessively high-density crosslinking can be prevented, so that the toner produced by using the resulting polyester can be inhibited from being deteriorated in low-temperature fusing ability. From the same viewpoints as described above, the content of the trivalent or higher-valent alcohol component in the whole alcohol components is more preferably from 6 to 32 mol %, even more preferably from 7 to 30 mol % and further even more preferably from 8 to 25 mol %.

When the resin emulsion or the toner contains two or more kinds of polyesters, the content (mol %) of the constitutional unit derived from the trivalent or higher-valent alcohol component and/or the constitutional unit derived from the trivalent or higher-valent carboxylic acid component may be determined as a sum of the values respectively calculated by multiplying a content (mol %) of the constitutional unit(s) in each polyester by a proportion of the polyester based on the whole polyesters.

As the other monomer components of the polyester, there may be usually used known divalent or lower-valent alcohol components, and known acid components such as divalent or lower-valent carboxylic acids, carboxylic anhydrides and carboxylic esters.

Examples of the carboxylic acid component other than the trivalent or higher-valent carboxylic acid component include divalent carboxylic acids, e.g., dicarboxylic acids such as phthalic acid, isophthalic acid, terephthalic acid, fumaric acid, maleic acid, adipic acid and succinic acid; succinic acids substituted with an alkyl group having 1 to 20 carbon atoms or an alkenyl group having 2 to 20 carbon atoms such as dodecenylsuccinic acid and octenylsuccinic acid; and anhydrides and alkyl ($C_1$ to $C_3$) esters of these acids.

These carboxylic acid components may be used alone or in combination of any two or more thereof.

Examples of the alcohol component other than the trivalent or higher-valent alcohol component include divalent alcohols, e.g., alkylene ($C_2$ to $C_3$) oxide adducts (average molar number of addition: 1 to 16) of bisphenol A such as polyoxypropylene-2,2-bis(4-hydroxyphenyl)propane and polyoxyethylene-2,2-bis(4-hydroxyphenyl)propane, ethylene glycol, propylene glycol, butanediol, neopentyl glycol, hexanediol, and alkylene ($C_2$ to $C_4$) oxide adducts (average molar number of addition: 1 to 16) of these alcohols.

These alcohol components may be used alone or in combination of any two or more thereof.

The polyester may be produced, for example, by polycondensing the alcohol component and the carboxylic acid component in an inert gas atmosphere at a temperature of about 180 to 250° C. by using, if required, an esterification catalyst.

Examples of the esterification catalyst include tin compounds such as dibutyl tin oxide and tin dioctylate, and titanium compounds such as titanium diisopropylate bistriethanol aminate. The amount of the esterification catalyst used is preferably from 0.01 to 1 part by weight and more preferably from 0.1 to 0.6 part by weight on the basis of 100 parts by weight of a sum of the alcohol component and the carboxylic acid component.

From the viewpoint of a good fusing ability and a good heat-resistant storage property of the resultant toner, the polyester preferably has a softening point (T1/2) of from 70 to 165° C. and more preferably from 70 to 125° C., and a glass transition temperature of from 50 to 85° C. and more preferably from 65 to 80° C. The acid value of the polyester is preferably from 6 to 35 mg KOH/g, more preferably from 10 to 35 mg KOH/g and even more preferably from 15 to 35 mg KOH/g from the viewpoint of facilitated production of the emulsion. The softening point or the acid value of the polyester may be desirably adjusted by controlling the kinds and blending proportions of the monomers used, and the temperature and time used in the polycondensation reaction.

Meanwhile, when the binder resin is in the form of a mixture of a plurality of resins, the softening point, glass transition point and acid value of the binder resin mean those values of the mixture.

Nonionic Surfactant

The resin emulsion of the present invention contains a nonionic surfactant in an amount of from 0.1 to 1.0 part by weight on the basis of 100 parts by weight of the binder resin. When incorporating the above-specified amount of the nonionic surfactant, the resulting emulsion can exhibit a good emulsification stability, and the toner obtained by using the emulsion can be improved in fusing ability and heat-resistant storage property. From the same viewpoints as described above, the content of the nonionic surfactant in the resin emulsion is preferably from 0.3 to 1.0 part by weight and more preferably from 0.5 to 1.0 part by weight on the basis of 100 parts by weight of the binder resin.

In the present invention, the cloud point of the nonionic surfactant is preferably 70° C. or higher and more preferably 80° C. or higher from the viewpoint of a good emulsification thereof. Meanwhile, the cloud point of the nonionic surfactant as used herein means a temperature at which a transparent aqueous solution of the nonionic surfactant starts to cause turbidity when the temperature of the aqueous solution is raised, and may be measured by any suitable methods conventionally known to the person skilled in the art. For example, the cloud point of the nonionic surfactant may be determined by observing, by naked eyes, a temperature at which an aqueous solution containing the nonionic surfactant as prepared undergoes solid-liquid separation when gradually raising the temperature of the aqueous solution. Alternatively, the could point of the nonionic surfactant may be determined from change in light transmittance of the aqueous solution using a spectroscope. If it is required to measure the cloud point more precisely, conventionally known optical methods for measuring a cloud point of surfactants may be directly applied to measurement of the cloud point of the nonionic surfactant.

The nonionic surfactant is not particularly limited. Examples of the nonionic surfactant include polyoxyethylene alkyl ethers, polyoxyethylene alkyl phenyl ethers, sorbitan monostearate and polyoxyethylene alkyl amines. In the present invention, among these nonionic surfactants, from the viewpoints of a good fusing ability and a good image characteristic of the resulting toner, preferred are polyoxyethylene (average molar number of addition: 10 to 60 mol) alkyl ($C_8$ to $C_{18}$) ethers, and more preferred are those polyoxyethylene alkyl ethers in which the alkyl group has 12 to 18 carbon atoms and/or the average molar number of addition of EO is from 12 to 18. Specific examples of the preferred nonionic surfactants include polyoxyethylene oleyl ether, polyoxyethylene stearyl ether and polyoxyethylene lauryl ether.

In the present invention, these nonionic surfactants may be used alone or in combination of any two or more thereof.

Anionic Surfactant

The resin emulsion of the present invention contains an anionic surfactant in addition to the above nonionic surfactant. The resin emulsion of the present invention contains the anionic surfactant in an amount of from 0.1 to 5 parts by weight on the basis of 100 parts by weight of the binder resin. When incorporating the anionic surfactant in the above-specified amount, the resulting resin emulsion can exhibit a good emulsification stability, thereby enabling production of finer emulsified particles. From this viewpoint, the content of the anionic surfactant in the resin emulsion is more preferably from 0.3 to 4.5 parts by weight, even more preferably from 0.5 to 4 parts by weight, further even more preferably from 1.0 to 4 parts by weight and further even more preferably from 2 to 4 parts by weight on the basis of 100 parts by weight of the binder resin.

In the present invention, from the viewpoints of achieving a good emulsification stability and obtaining fine emulsified particles, the anionic surfactant is preferably added upon production of the resin emulsion.

The anionic surfactant is not particularly limited. Examples of the anionic surfactant include sulfate-based surfactants, sulfonate-based surfactants, phosphate-based surfactants and soap-based surfactants. Specific examples of the anionic surfactant include sodium dodecylbenzenesulfonate, sodium dodecylsulfate, sodium alkylethersulfates, sodium alkylnaphthalenesulfonates and sodium dialkylsulfosuccinates. Among these anionic surfactants, preferred is sodium dodecylbenzenesulfonate.

In the present invention, these anionic surfactants may be used alone or in combination of any two or more thereof.

The resin particles dispersed in the resin emulsion of the present invention preferably contain the above nonionic surfactant and the above anionic surfactant in such an amount that a weight ratio of the nonionic surfactant to the anionic surfactant (nonionic surfactant/anionic surfactant) is from 0.1 to 0.9 from the viewpoint of achieving both a good emulsification of the resin particles and a good storage property of the resulting toner. The weight ratio of the nonionic surfactant to the anionic surfactant (nonionic surfactant/anionic surfactant) in the resin emulsion is more preferably from 0.1 to 0.8, even more preferably from 0.1 to 0.7 and further even more preferably from 0.1 to 0.5.

In the present invention, the contents of the nonionic surfactant and the anionic surfactant in the resin emulsion are substantially the same as the amounts of the nonionic surfactant and the anionic surfactant used when emulsifying the resin. The contents of the surfactants in the resin emulsion may be measured by the below-mentioned method.

Aqueous Medium

The resin emulsion of the present invention contains an aqueous medium. The aqueous medium as used herein means a water-based medium which is not composed substantially of an organic solvent solely, and the water-based medium contains water as a main component, i.e., has a water content of 50% or more. From the viewpoint of a good environmental suitability, the water content in the aqueous medium is preferably 80% by weight or more, more preferably 90% by weight or more and even more preferably 100% by weight.

Examples of components other than water which may be contained in the aqueous medium include water-soluble organic solvents such as methanol, ethanol, isopropanol, butanol, acetone, methyl ethyl ketone and tetrahydrofuran. Among these organic solvents, from the viewpoint of less inclusion into the toner, preferred are alcohol-based organic solvents incapable of dissolving resins therein such as methanol, ethanol, isopropanol and butanol. In the present invention, the binder resin is preferably dispersed in the form of fine particles in water solely substantially without using any organic solvent.

Other Components

Further, the resin emulsion of the present invention may also contain a colorant, a charge controlling agent, a releasing agent, the other surfactants, a fusing improver, etc.

The colorant used in the present invention is not particularly limited, and may be appropriately selected from known black, yellow, magenta and cyan colorants, etc. Specific examples of the colorant include various pigments such as carbon blacks, inorganic composite oxides, Chrome Yellow, Hansa Yellow, Benzidine Yellow, Threne Yellow, Quinoline Yellow, Permanent Orange GTR, Pyrazolone Orange, Vulcan Orange, Watchung Red, Permanent Red, Brilliant Carmine 3B, Brilliant Carmine 6B, quinacridones, DuPont Oil Red, Pyrazolone Red, Lithol Red, Rhodamine B Lake, Lake Red C, red iron oxide, Methylene Blue Chloride, Phthalocyanine Blue, Phthalocyanine Green and Malachite Green Oxalate; and various dyes such as acridine dyes, xanthene dyes, azo dyes, benzoquinone dyes, azine dyes, anthraquinone dyes, indigo dyes, thioindigo dyes, phthalocyanine dyes, Aniline Black dyes and thiazole dyes. These colorants may be used alone or in combination of any two or more thereof.

The content of the colorant in the resin emulsion is preferably 25 parts by weight or less, more preferably from 0.01 to 10 parts by weight and even more preferably from 3 to 10 parts by weight on the basis of 100 parts by weight of the binder resin from the viewpoints of a good tinting power and a good transparency of the obtained images.

The colorant may be used in the form of any of a dried powder, a master batch prepared by previously dispersing the colorant in the resin, and a colorant-containing aqueous material such as a wet cake and a water dispersion.

Examples of the releasing agent include low-molecular weight polyolefins such as polyethylene, polypropylene and polybutene; silicones exhibiting a softening point upon heating; fatty acid amides such as oleamide, erucamide, ricinolamide and stearamide; vegetable waxes such as carnauba wax, rice wax, candelilla wax, haze wax and jojoba oil; animal waxes such as beeswax; mineral and petroleum waxes such as montan wax, ozokerite, ceresin, paraffin wax, microcrystalline wax and Fischer-Tropsch wax; and the like. These releasing agents are preferably used as such or in the form of a dispersion in an aqueous medium, and may be used alone or in combination of any two or more thereof.

The content of the releasing agent in the resin emulsion is usually from about 1 to about 20 parts by weight and preferably from 2 to 15 parts by weight on the basis of 100 parts by weight of the binder resin in view of attaining good effects due to addition thereof and preventing occurrence of adverse influence on chargeability of the resulting toner.

Examples of the charge controlling agent include metal salts of benzoic acid, metal salts of salicylic acid, metal salts of alkylsalicylic acids, metal salts of catechol, metal-containing bisazo dyes, tetraphenyl borate derivatives, quaternary ammonium salts and alkyl pyridinium salts.

The content of the charge controlling agent in the resin emulsion is preferably 10 parts by weight or less and more preferably from 0.01 to 5 parts by weight on the basis of 100 parts by weight of the binder resin.

Examples of the surfactants other than the above nonionic surfactant and anionic surfactant include cationic surfactants such as amine salt-type surfactants and quaternary ammonium salt-type surfactants. Specific examples of the surfactants include alkylbenzenedimethyl ammonium chlorides, alkyltrimethyl ammonium chlorides and distearyl ammonium chlorides.

Resin Emulsion

The volume-median particle size ($D_{50}$) of the emulsified particles contained in the resin emulsion is preferably from 0.02 to 2 μm, more preferably from 0.05 to 1 μm, even more preferably from 0.05 to 0.6 μm and further even more preferably from 0.08 to 0.4 μm for the purpose of uniform aggregation thereof in the subsequent aggregating treatment. As to the particle size distribution of the emulsified particles, from the same viewpoints as described above, the CV value (Standard Deviation of Particle Size Distribution/Volume-Median Particle Size ($D_4$)×100) is preferably 60 or less, more preferably 45 or less and even more preferably 35 or less. Meanwhile, the "volume-median particle size ($D_{50}$)" as used herein means a particle size at which a cumulative volume frequency calculated on the basis of a volume fraction of particles from a smaller particle size side thereof is 50%. Also, the "volume-median particle size ($D_4$)" as used herein means an average particle size as similarly calculated on the basis of the volume fraction. These volume-median particle sizes may be measured by the below-mentioned methods.

In the present invention, the softening point (T1/2) of the emulsified particles contained in the resin emulsion is from 105 to 155° C. as measured by a flow tester method. When the softening point (T1/2) of the emulsified particles is lower than 105° C., the resulting toner tends to be deteriorated in durability and high-temperature anti-offset property. When the softening point (T1/2) of the emulsified particles is higher than 155° C., the resulting toner tends to be deteriorated in low-temperature fusing ability. From the viewpoints of a good durability, a good high-temperature anti-offset property and a good low-temperature fusing ability of the resulting toner, the softening point (T1/2) of the emulsified particles contained in the resin emulsion is preferably from 110 to 150° C., more preferably from 110 to 145° C. and even more preferably from 110 to 130° C.

The glass transition point of the emulsified particles contained in the resin emulsion is preferably from 56 to 80° C., more preferably from 58 to 78° C. and even more preferably from 59 to 77° C. from the viewpoints of a good heat-resistant storage property, a good durability and a good low-temperature fusing ability of the resulting toner.

The softening point and glass transition point of the emulsified particles contained in the resin emulsion may be determined by subjecting the emulsified particles obtained by drying the resin emulsion to the respective measurements. The resin emulsion may be dried, for example, by freeze-drying, etc. The term "drying" as used herein means such a condition that a material is dried until a water content thereof reaches 1% or less as measured by the below-mentioned method.

In the method of "emulsifying the binder resin containing a polyester having a constitutional unit derived from a trivalent or higher-valent alcohol component and/or a constitutional unit derived from a trivalent or higher-valent carboxylic acid component in an aqueous medium in the presence of the nonionic surfactant and the anionic surfactant", the binder resin containing the above-described polyester may be emulsified in the presence of the above-described nonionic surfactant and anionic surfactant.

The process for producing the resin emulsion according to the present invention is described in detail below.

[Process for Producing Resin Emulsion]

The process for producing the resin emulsion according to the present invention preferably includes the steps of (a) mixing a resin containing a polyester having at least one constitutional unit selected from the group consisting of a constitutional unit derived from a trivalent or higher-valent alcohol component and a constitutional unit derived from a trivalent or higher-valent carboxylic acid component, an anionic surfactant, a nonionic surfactant and an aqueous medium with each other at a temperature not lower than a softening temperature (Ts) of the resin as measured by a flow tester method (hereinafter referred to merely as a "softening temperature (Ts)"), the nonionic surfactant and the aqueous medium being used in amounts of from 0.1 to 1.0 part by weight and from 10 to 50 parts by weight, respectively, on the basis of 100 parts by weight of the resin; and (b) neutralizing a mixture obtained in the step (a) with a basic compound in an aqueous medium at a temperature not higher than the softening point (T1/2) of the resin. Further, via a step of adding an aqueous medium to the mixture obtained in the step (b) at a temperature not lower than the softening temperature (Ts) of the resin, it is possible to obtain the resin emulsion as aimed.

In the present invention, when the resin, the nonionic surfactant, the anionic surfactant and the aqueous medium are mixed with each other at a temperature not lower than the softening temperature (Ts) of the resin, it is possible to obtain a uniform mixture of the resin, the surfactants and the aqueous medium. As a result, the aqueous medium can be efficiently dispersed in the resin, so that the neutralization step can be efficiently carried out. These effects enable production of finer emulsified particles even when using the crosslinked polyester. The "softening temperature (Ts)" as used herein means the temperature at which softening of a resin is initiated when heating the resin at a constant temperature rise rate using a flow tester, namely, the temperature Ts at the point B shown in FIG. 1 as described above. More specifically, the softening temperature (Ts) may be measured by the below-mentioned method.

Step (a)

In the step (a), the resin containing a polyester having a constitutional unit derived from a trivalent or higher-valent alcohol component and/or a constitutional unit derived from a trivalent or higher-valent carboxylic acid component, an anionic surfactant, a nonionic surfactant and an aqueous medium are mixed with each other at a temperature not lower than the softening temperature (Ts) of the resin, wherein the nonionic surfactant and the aqueous medium are used in amounts of from 0.1 to 1.0 part by weight and from 10 to 50 parts by weight, respectively, on the basis of 100 parts by weight of the resin.

The details of the resin containing a polyester having a constitutional unit derived from a trivalent or higher-valent alcohol component and/or a constitutional unit derived from a trivalent or higher-valent carboxylic acid component, the nonionic surfactant, the anionic surfactant and the aqueous medium, as well as other optional components which may be used if desired, are respectively the same as those for the resin emulsion as described previously.

More specifically, in the step (a), for example, the resin, the nonionic surfactant, the anionic surfactant, the aqueous medium and, if required, various other additives such as a colorant, are mixed with each other. The amounts of the nonionic surfactant and the anionic surfactant used in the step (a) are the same as the contents of these surfactants in the resin emulsion as described previously.

In the step (a), from the viewpoint of a good emulsifiability, the mixing of the respective components is carried out at a temperature not lower than the softening temperature (Ts) of the resin, preferably not lower than the temperature which is higher by 3° C. than the softening temperature (Ts) of the resin (hereinafter referred to merely as the temperature calculated from "softening temperature (Ts) of the resin+(plus) 3° C.", and more preferably not lower than the temperature calculated from "softening temperature (Ts) of the resin+(plus) 5° C.". Thus, by mixing the resin, the nonionic surfactant and the anionic surfactant with each other at a temperature not lower than the temperature at which softening of the resin is initiated (i.e., softening initiation temperature of the resin), it is possible to uniformly mix the resin with the nonionic surfactant and the anionic surfactant. The temperature upon the mixing is preferably not higher than the temperature calculated from "softening point (T1/2) of the resin+(plus) 10° C." and more preferably not higher than the temperature calculated from "softening point (T1/2) of the resin+(plus) 5° C.". The resulting mixture may be in the form of not only a solid but also any of a liquid, a paste and a melt having a viscosity intermediate between those of the liquid and paste, as long as the nonionic surfactant, anionic surfactant and aqueous medium are mixed with the resin. In the present invention, it is preferred that the nonionic surfactant act for lowering a substantial softening point of the resin, and the anionic surfactant, the nonionic surfactant and the aqueous medium be efficiently dispersed in the resin.

The process for producing the resin emulsion according to the present invention includes the step of mixing from 10 to 50 parts by weight of the aqueous medium in the binder resin at a temperature not lower than the softening temperature of the resin. When using the aqueous medium in an amount of from 10 to 50 parts by weight, it is possible to uniformly disperse the nonionic surfactant in the resin, resulting in facilitated procedure of the subsequent neutralization step. From the above-mentioned viewpoint, the aqueous medium is preferably used in an amount of from 12 to 50 parts by weight and more preferably from 15 to 45 parts by weight on the basis of the binder resin. Also, from the same viewpoint, the content of water in the resulting mixture is preferably from 10 to 45% by weight, more preferably from 10 to 40% by weight and even more preferably from 10 to 30% by weight.

Step (b)

In the step (b), the mixture obtained in the step (a) is neutralized with a basic compound in an aqueous medium at a temperature not higher than the softening point (T1/2) of the above resin.

The aqueous medium used in the step (b) may be the same as described for the above resin emulsion.

As the basic compound, there are preferably used alkalis capable of enhancing a self-dispersibility of the polyester when the polyester forms a salt with these alkalis. Specific examples of the basic compound include inorganic basic compounds, e.g., alkali metal hydroxides such as sodium hydroxide, potassium hydroxide and lithium hydroxide, weak acid salts of these alkali metal hydroxides such as carbonates and acetates or partially neutralized salts thereof, and ammonia; and organic basic compounds, e.g., alkyl amines such as methylamine, dimethylamine, trimethylamine, ethylamine, diethylamine and triethylamine, alkanol amines such as diethanol amine, and fatty acid salts such as sodium succinate and sodium stearate. Among these basic compounds, from the viewpoint of efficiently conducting the neutralization, preferred is potassium hydroxide. These basic compounds may be used alone or in combination of any two or more thereof.

The basic compound may be used in the form of a basic aqueous medium prepared by dissolving the basic compound in the above aqueous medium. The concentration of the basic compound in the aqueous medium is preferably from 1 to 20% by weight, more preferably from 1 to 10% by weight and even more preferably from 1.5 to 7.5% by weight.

The basic compound may be used for the purpose of neutralizing the mixture obtained in the step (a). From the viewpoint of effectively carrying out the neutralization, the basic compound is preferably added in the step (b), and more preferably added in the step (b) without addition thereof in the step (a). More specifically, after the respective surfactants are dispersed in the resin in the step (a), the basic compound is added in the step (b), so that the neutralization can be carried out in an effective and uniform manner.

From the viewpoint of uniformly neutralizing the resin in the step (b), the neutralization is preferably conducted while stirring. The stirring time is preferably 30 min or longer and more preferably 1 h or longer.

From the viewpoints of fully conducting the neutralization, inhibiting formation of excessively large emulsified particles in the emulsifying treatment in the subsequent step, and requiring no special apparatus for heating treatment for the neutralization, the neutralization temperature is not higher than the softening point (T$1/2$) of the above resin, preferably not higher than the temperature calculated from "softening point (T$1/2$) of the resin–(minus) 5° C.", and more preferably not higher than the temperature calculated from "softening point (T$1/2$) of the resin–(minus) 10° C.". The lower limit temperature for the neutralization treatment is a softening temperature (Ts) of the above resin from the viewpoint of attaining a good emulsification property and fully conducting the neutralization. From the above viewpoints, the temperature upon the neutralization is preferably not lower than the softening temperature (Ts) of the resin and not higher than the temperature calculated from "softening point (T$1/2$) of the resin–(minus) 5° C.", and more preferably not lower than the softening temperature (Ts) of the resin and not higher than the temperature calculated from "softening point (T$1/2$) of the resin–(minus) 10° C.".

In the neutralizing step, the resin is not necessarily neutralized entirely (100%) and may be neutralized to such an extent as to impart thereto a hydrophilicity required for producing the emulsified particles in the next step. For example, when using a high-hydrophilic resin containing a large number of polar groups, the degree of neutralization of such a resin may be low, whereas when using a low-hydrophilic resin, the degree of neutralization of the resin is preferably high. The degree of neutralization of the resin may be suitably controlled by varying an amount of the basic compound added in the neutralization step. In the present invention, the degree of neutralization of the resin is preferably 50% or higher, more preferably from 60 to 100% and even more preferably from 70 to 100%. The degree of neutralization is generally expressed by a ratio between numbers of moles of the acid group before and after the neutralization (number of moles of acid group after neutralization/number of moles of acid group before neutralization). More specifically, for example in the case where the polyester is a resin to be neutralized, the degree of neutralization thereof may be determined by measuring an acid value thereof before and after the neutralization.

In the production process of the present invention, it is preferred that an aqueous medium be added to the mixture neutralized in the step (b) to subject the binder resin to phase reversal and emulsification therein. More specifically, after neutralizing the mixture in the step (b), while stirring the mixture, the aqueous liquid is added thereto at the same temperature as that of the neutralizing step, preferably at a temperature not higher than the temperature calculated from "softening point (T$1/2$) of the resin–(minus) 10° C." to emulsify the resin therein, thereby enabling production of an emulsion containing finer resin particles.

The aqueous medium to be added to the mixture may be the same water-based medium as used in the step (b). The rate of addition of the aqueous medium is preferably from 0.5 to 50 g/min, more preferably from 0.5 to 30 g/min and even more preferably from 1 to 20 g/min per 100 g of the resin from the viewpoint of effectively conducting the emulsification. The rate of addition of the aqueous medium may be usually maintained until an O/W type emulsion is substantially formed. Therefore, the rate of addition of the aqueous medium after forming the O/W type emulsion is not particularly limited. The amount of the aqueous medium added to the mixture is preferably from 100 to 2,000 parts by weight and more preferably from 150 to 1,500 parts by weight on the basis of 100 parts by weight of the resin forming the resin particles from the viewpoint of obtaining uniform aggregated particles in the subsequent aggregating treatment.

The solid concentration of the thus obtained resin emulsion is preferably from 5 to 50% by weight, more preferably from 5 to 45% by weight, even more preferably from 10 to 40% by weight and further even more preferably from 20 to 35% by weight from the viewpoints of a good stability of the resulting emulsion and a good handling property of the resin emulsion and occurrence of uniform aggregation in the subsequent aggregating step.

The resin emulsion of the present invention may also be produced by alternative methods. For example, there may be mentioned such a method in which a polycondensable monomer as a raw material of the aimed resin particles is emulsified and dispersed in an aqueous medium in the presence of the above nonionic surfactant and anionic surfactant by mechanical shearing or application of ultrasonic wave. In this case, if required, a polycondensation catalyst and various additives such as surfactants may be added to the water-soluble medium. In addition, the resulting solution may be subjected, for example, to heat treatment, thereby allowing the polycondensation to proceed. For example, in the case where the polyester is used as the resin, a polycondensable monomer of the polyester and a polycondensation catalyst therefor may be used.

If the amount of the surfactant, in particular, the nonionic surfactant, used in the emulsification step is large, the differences in softening point and glass transition point between the binder resin as the raw material and the resin particles obtained after the emulsification step are increased. The toner obtained by using the emulsion having large differences in both softening point and glass transition point between the binder resin and the resin particles tends to exhibit a low softening point an a low glass transition point and tends to be deteriorated in durability and high-temperature anti-offset property. On the contrary, according to the present invention, the differences in softening point and glass transition point between the binder resin and the resin particles can be reduced. As a result of intense studies, it is preferred that the differences in softening point and glass transition point between the binder resin as the raw material and the resin particles obtained after the emulsification step respectively lie within 10° C., from the same viewpoints as described above.

[Process for Producing Toner for Electrophotography]

In the process for producing a toner for electrophotography according to the present invention, there is used the above process for producing the resin emulsion. More specifically, the process for producing a toner according to the present invention includes, for example, the steps of (1) obtaining the resin emulsion by the method including the above steps (a) and (b); and (2) aggregating and coalescing the emulsified particles contained in the resin emulsion obtained in the step (1). The toner for electrophotography is thus obtained by the above production process. The above step (1) is the same as described previously. In the following, the step (2) is explained.

Step (2)

(Aggregating Step)

In the aggregating step, the solid concentration of the resin emulsion used therein is preferably controlled to the above-specified value in order to cause uniform aggregation of the resin particles. From the viewpoint of achieving both a good dispersion stability of the mixed liquid and a good aggregating property of fine particles of the binder resin, etc., the pH value of the system is preferably controlled to the range of from 2 to 10, more preferably from 2 to 9 and even more preferably from 3 to 8.

From the same viewpoints as described above, the temperature of the system in the aggregating step is preferably not higher than a glass transition point of the binder resin, more preferably not higher than the temperature calculated from "glass transition point of the resin–(minus) 5° C." and even more preferably not higher than the temperature calculated from "glass transition point of the resin–(minus) 10° C.".

In the aggregating step, if required, known additives such as a colorant, a charge controlling agent and a releasing agent may be incorporated in the resin emulsion. Among these additives, from the viewpoints of a good fusing ability and a good high-temperature anti-offset property, the releasing agent is preferably incorporated in the resin emulsion. More preferably, a releasing agent dispersion containing releasing agent particles is added to the resin emulsion upon aggregation thereof.

From the viewpoints of a good fusing ability and a good durability of the resulting toner, the releasing agent particles contained in the releasing agent dispersion preferably have a volume-median particle size ($D_{50}$) of 1 μm or less, more preferably from 0.05 to 1 μm and even more preferably from 0.1 to 0.85 μm. From the viewpoints of a good fusing ability and a good durability of the resulting toner as well as a good aggregation property of the resin emulsion, the releasing agent particles contained in the releasing agent dispersion preferably have a narrow particle size distribution, more specification, have a CV value (standard deviation of particle size distribution/volume-median particle size ($D_{50}$)×100) of 50 or less, more preferably 45 or less and even more preferably 40 or less.

In the aggregating step, in order to effectively carry out the aggregation, an aggregating agent is preferably added.

Examples of the aggregating agent include a cationic surfactant in the form of a quaternary salt, an organic aggregating agent such as polyethyleneimine, and an inorganic aggregating agent such as an inorganic metal salt, an ammonium salt and a divalent or higher-valent metal complex. The inorganic metal salt includes, for example, metal salts such as sodium sulfate, sodium chloride, calcium chloride, calcium nitrate, barium chloride, magnesium chloride, zinc chloride, aluminum chloride and aluminum sulfate; and inorganic metal salt polymers such as poly(aluminum chloride), poly(aluminum hydroxide) and poly(calcium sulfide). In the present invention, from the viewpoints of controlling a particle size of the toner with a high accuracy and achieving a sharp particle size distribution thereof, a monovalent salt is preferably used as the aggregating agent. The "monovalent salt" as used herein means that a valence of a metal ion or an cation constituting the salt is 1. Examples of the monovalent salt as the aggregating agent include organic aggregating agents such as cationic surfactants in the form of a quaternary salt, and inorganic aggregating agents such as an inorganic metal salt and an ammonium salt. In the present invention, among these aggregating agents, from the viewpoints of controlling a particle size of the toner with a high accuracy and achieving a sharp particle size distribution thereof, preferred are water-soluble nitrogen-containing compounds having a molecular weight of 350 or less.

The water-soluble nitrogen-containing compounds having a molecular weight of 350 or less are preferably acidic compounds in order to rapidly aggregate the resin particles. The pH value of an aqueous solution containing 10% by weight of the water-soluble nitrogen-containing compound is preferably from 4 to 6 and more preferably from 4.2 to 6 as measured at 25° C. Also, from the viewpoints of a good charging property under high-temperature and high-humidity conditions, etc., the water-soluble nitrogen-containing compounds preferably have a molecular weight of 350 or less and more preferably 300 or less. Examples of the water-soluble nitrogen-containing compounds include ammonium salts such as ammonium halides, ammonium sulfate, ammonium acetate, ammonium benzoate and ammonium salicylate; and quaternary ammonium salts such as tetraalkyl ammonium halides. From the viewpoint of a good productivity, among these compounds, preferred are ammonium sulfate (pH value of 10 wt % aqueous solution thereof as measured at 25° C. (hereinafter referred to merely as a "pH value"): 5.4), ammonium chloride (pH value: 4.6), tetraethyl ammonium bromide (pH value: 5.6) and tetrabutyl ammonium bromide (pH value: 5.8).

The amount of the aggregating agent used varies depending upon the valence of electric charge of the aggregating agent used. When using a monovalent aggregating agent, the amount of the aggregating agent used is preferably from 2 to 50 parts by weight, more preferably from 3.5 to 40 parts by weight and even more preferably from 3.5 to 30 parts by weight on the basis of 100 parts by weight of the binder resin from the viewpoint of a good aggregating property.

The aggregating agent to be added is preferably used in the form of a solution in an aqueous medium. Upon adding the aggregating agent to the resin emulsion and after completion of the addition, it is preferred that the obtained mixture be fully stirred.

In order to uniformly aggregate the resin emulsion, it is preferred that the aggregating agent be added thereto after suitably controlling the pH value of the system and at a temperature not higher than a glass transition point of the resin forming the resin particles and preferably not higher than the temperature calculated from the "glass transition point of the resin–(minus) 10° C.". The aggregating agent may be added either at one time, intermittently or continuously. In addition, upon adding the aggregating agent and after completion of the addition, the obtained mixture is preferably fully stirred.

In the present invention, after aggregating the emulsified particles, a surfactant is preferably added to the resulting emulsion, and more preferably at least one salt selected from the group consisting of alkylethersulfuric acid salts, alkylsulfuric acid salts and linear alkylbenzenesulfonic acid salts is added thereto.

The alkylethersulfuric acid salts are preferably represented by the following formula (1):

In the formula (1), $R^1$ represents an alkyl group. From the viewpoints of a good adsorption to the aggregated particles and a good residual property in the toner, the alkyl group as $R^1$ preferably has 6 to 20 carbon atoms and more preferably 8 to 15 carbon atoms. The suffix p represents an average molar number of addition ranging from 0 to 15, and the average molar number of addition is preferably from 1 to 10 and more preferably from 1 to 5 from the viewpoint of well controlling a particle size of the aggregated particles. $M^1$ represents a monovalent cation, and is preferably sodium, potassium or ammonium and more preferably sodium or ammonium from the viewpoint of well controlling a particle size of the aggregated particles.

Also, the linear alkylbenzenesulfonic acid salts are not particularly limited. From the viewpoints of a good adsorption into the aggregated particles and a good residual property in the toner, the linear alkylbenzenesulfonic acid salts are preferably those salts represented by the following formula (2):

$$R^2\text{-}Ph\text{-}SO_3M^2 \qquad (2).$$

In the formula (2), $R^2$ represents a linear alkyl group. Examples of $R^2$ include the same linear alkyl groups among those alkyl groups exemplified as $R^1$ in the above formula (1). Ph represents a phenyl group, and $M^2$ represents a monovalent cation. As the suitable linear alkylbenzenesulfonic acid salts, there are preferably used sodium sulfate salts thereof.

The above surfactant is added in an amount of preferably from 0.1 to 15 parts by weight, more preferably from 0.1 to 10 parts by weight and even more preferably from 0.1 to 8 parts by weight on the basis of 100 parts by weight of the resin forming the aggregated particles from the viewpoints of a good property for stopping aggregation and a good residual property in the resultant toner.

In the present invention, the volume-median particle size $(D_{50})$ of the aggregated particles is preferably from 1 to 10 μm, more preferably from 2 to 10 μm and even more preferably from 2 to 9 μm from the viewpoints of a high image quality.

In the present invention, from the viewpoints of preventing occurrence of run-off of the releasing agent, etc., or maintaining electric charge amounts between respective colors in a color toner at the same level, upon the aggregation, other fine emulsified particles may be added to the emulsified particles contained in the emulsion obtained in the step (1) (hereinafter occasionally referred to as the "emulsified particles of the present invention") at one time or may be intermittently added thereto in plural divided parts. Conversely, the emulsified particles of the present invention may be added to the other fine emulsified particles at one time or may be intermittently added thereto in plural divided parts to subject these particles to aggregation (the other fine emulsified particles added may be referred to as a shell material, whereas the emulsified particles to which the fine emulsified particles are added may be referred to as a core material).

The other fine emulsified particles to be added to the emulsified particles of the present invention are not particularly limited. For example, the fine emulsified particles may be produced by the same method as used for production of the emulsified particles of the present invention.

In the present invention, the other fine emulsified particles may be the same as or different from the emulsified particles of the present invention. From the viewpoint of achieving both a good low-temperature fusing ability and a good storage property of the resulting toner, it is preferred that the fine emulsified particles which are different in kind from the emulsified resin particles of the present invention be subsequently added either at one time or intermittently in plural divided parts.

In this step, the other fine emulsified particles may be mixed with the aggregated particles obtained by adding the aggregating agent to the resin emulsion of the present invention.

In the present invention, the time of addition of the other fine emulsified particles is not particularly limited. However, from the viewpoint of a good productivity, the other fine emulsified particles are preferably added during a period of from completion of addition of the aggregating agent to initiation of the subsequent coalescing step.

In this step, the emulsion of the present invention may also be mixed with the aggregated particles obtained by adding the aggregating agent to the other fine emulsified particles.

The blending ratio of the emulsified particles of the present invention to the other fine emulsified resin particles (emulsified particles of the present invention/other fine emulsified particles) is preferably from 0.1 to 2.0, more preferably from 0.2 to 1.5 and even more preferably from 0.3 to 1.0 in terms of a weight ratio therebetween from the viewpoint of achieving both a good low-temperature fusing ability and a good heat-resistant storage property of the resulting toner.

The thus obtained aggregated particles are then subjected to the step for coalescing the aggregated particles (coalescing step).

(Coalescing Step)

In this step, the aggregated particles obtained in the above aggregating step are coalesced.

In the present invention, the aggregated particles obtained in the aggregating step are heated to obtain coalesced particles. In the coalescing step, the temperature of the system is preferably controlled to the same temperature as used in the system of the aggregating step or higher. The temperature of the system used in the coalescing step is more preferably not lower than the glass transition point of the binder resin and not higher than the temperature calculated from the "softening point (T1/2) of the resin+(plus) 20° C."; more preferably not lower than the temperature calculated from the "grass transition point of the resin+(plus) 5° C." and not higher than the temperature calculated from the "softening point (T1/2) of the resin+(plus) 15° C."; and even more preferably not lower than the temperature calculated from the "grass transition point of the resin+(plus) 10° C." and not higher than the temperature calculated from the "softening point (T1/2) of the resin+(plus)10° C." from the viewpoints of well controlling a particle size, a particle size distribution and a shape of the toner as aimed, and attaining a good fusibility of the aggregated particles. In addition, the stirring rate used in the coalescing step is preferably a rate at which the aggregated particles are not precipitated.

The coalescing step may be carried out simultaneously with the aggregating step, for example, by continuously raising the temperature of the system, or by raising the temperature of the system to the temperature at which both the aggregation step and the coalescing step can be performed and then continuously stirring the system at that temperature.

The volume median particle size $(D_{50})$ of the coalesced particles is preferably from 1 to 10 μm, more preferably from 2 to 10 μm and even more preferably from 3 to 9 μm from the viewpoint of a high image quality.

The thus obtained coalesced particles may be appropriately subjected to a liquid-solid separation step such as filtration, a washing step, a drying step, etc., if required, thereby obtaining a toner.

In the washing step, the coalesced particles are preferably washed with an acid to remove metal ions from the surface of the respective toner mother particles for the purpose of ensuring sufficient charging characteristics and a good reliability of the resultant toner. The acid washing procedure is preferably carried out plural times.

In addition, in the drying step, any optional methods such as vibration-type fluidization drying method, spray-drying method, freeze-drying method and flash jet method may be employed. The water content in the toner obtained after drying is preferably adjusted to 1.5% by weight or less and more preferably 1.0% by weight or less from the viewpoint of good charging characteristics thereof.

In addition, in the drying step, any optional methods such as vibration-type fluidization drying method, spray-drying method, freeze-drying method and flash jet method may be employed. The water content in the toner obtained after drying is preferably adjusted to 1.5% by weight or less, more preferably 1.0% by weight or less and even more preferably 0.5% by weight or less from the viewpoint of good charging characteristics of the resulting toner.

In the present invention, an auxiliary agent such as a fluidizing agent may be added as an external additive to the resulting coalesced articles to treat the surface of the respective coalesced particles therewith (the toner before being treated with the external additive is also referred to as toner mother particles). As the external additive, there may be used known fine particles. Examples of the fine particles include inorganic fine particles such as fine silica particles whose surface is subjected to a hydrophobic treatment, fine titanium oxide particles, fine alumina particles, fine cerium oxide particles and carbon blacks; and fine polymer particles such as fine particles made of polycarbonates, polymethyl methacrylate, silicone resins, etc.

The amount of the external additive blended in the toner is preferably from 1 to 5 parts by weight and more preferably from 1.5 to 3.5 parts by weight on the basis of 100 parts by weight of the toner mother particles. Here, when a hydrophobic silica is used as the external additive, the hydrophobic silica is preferably added in an amount of from 1 to 3 parts by weight on the basis of 100 parts by weight of the toner mother particles.

The toner for electrophotography obtained according to the present invention may be used in the form of a one-component system developer or a tow-component system developer formed by mixing the toner with a carrier.

EXAMPLES

The present invention is described in more detail by referring to the following examples, etc. However, it should be noted that these examples, etc., are only illustrative and not intended to limit the invention thereto. In the following examples, etc, various properties were measured and evaluated by the following methods.

[Acid Value of Resins]

Determined according to JIS K0070. However, with respect to the solvent used upon the measurement, the mixed solvent of ethanol and ether was replaced with a mixed solvent containing acetone and toluene at a volume ratio of 1:1.

[Softening Temperature (Ts), Softening Point (T1/2) and Glass Transition Point of Resins]

(1) Using a flow tester "CFT-500D" available from Shimadzu corporation, 1 g of a sample was extruded through a nozzle having a die pore diameter of 1 mm and a length of 1 mm while heating the sample at a temperature rise rate of 6° C./min and applying a load of 1.96 MPa thereto by a plunger. The downward movement of the plunger of the flow tester relative to the temperature was plotted.

Softening Temperature (Ts): Determined as the temperature at which voids in the sample filled in a cylinder of the flow tester disappeared when compressing the sample therein, and an appearance of the sample filled in the cylinder was transformed into one uniform transparent mass or phase, i.e., the temperature shown by Ts in FIG. 1.

Softening Point (T1/2): The temperature at which a half of the amount of the sample in the flow tester was flowed out, i.e., the temperature shown by T1/2 in FIG. 1.

(2) Glass Transition Point

Using a differential scanning calorimeter ("DSC 210" commercially available from Seiko Instruments & Electronic, Ltd.), a sample was heated to 200° C. and then cooled from 200° C. to 0° C. at a temperature drop rate of 10° C./min, and thereafter heated again at temperature rise rate of 10° C./min to measure a glass transition point thereof. When a peak was observed at a temperature lower, by 20° C. or more, than the softening point (T1/2), the peak temperature was read as the glass transition point. Whereas, when a shift of the characteristic curve was observed without any peaks at the temperature lower, by 20° C. or more, than the softening point (T1/2), the temperature at which a tangential line having a maximum inclination of the curve in the portion of the curve shift was intersected with an extension of the baseline on the high-temperature side of the curve shift was read as the glass transition point. Meanwhile, the glass transition point is a property inherent to a non-crystalline portion of the resin, which may be generally observed in a non-crystalline polyester, or may also be observed in a non-crystalline portion of a crystalline polyester in some cases.

[Softening Point (T1/2) and Glass Transition Point of Emulsified Particles in Resin Emulsion]

Measured in the same manner as used above for measurements of the softening point and glass transition point of resins.

Meanwhile, when measuring the softening point and glass transition point of emulsified particles in the resin emulsion, the resin emulsion was freeze-dried to remove a solvent therefrom, and the obtained solid was subjected to measurements of a softening point and a glass transition point thereof. The freeze-drying of the resin emulsion was carried out as follows. That is, using a freeze dryer ("FDU-2100" available from Tokyo Rikakikai Co., Ltd.) and a rectangular dry chamber ("DRC-1000" available from Tokyo Rika Kiki Co., Ltd.), 30 g of the resin emulsion was vacuum-dried at −25° C. for 1 h, at −10° C. for 10 h and then at 25° C. for 4 h until the water content therein reached 1% or less.

Using an infrared moisture meter "FD-230" available from Kett Electronic Laboratory, 5 g of a sample obtained after the freeze-drying was dried at 150° C. to measure a water content (%) thereof under a measuring mode 96 (monitoring time: 2.5 min/variation range: 0.05%).

[Particle Size and Particle Size Distribution of Emulsified Particles and Releasing Agent Particles]

Using a laser diffraction particle size analyzer "LA-920" commercially available from Horiba Ltd., a cell for the measurement was filled with distilled water, and a volume-average particle size ($D_{50}$) and a volume-average particle size ($D_4$) of the particles were measured at a concentration at which an absorbance thereof fell within an adequate range. The particle size distribution was expressed by the CV value calculated according to the following formula:

$CV$ Value=(Standard Deviation of Particle Size Distribution/Volume−Average Particle Size($D_4$)×100).

[Solid concentration of Emulsion]

Using an infrared moisture meter "FD-230" available from Kett Electronic Laboratory, 5 g of the emulsion was dried at 150° C. to measure a water content (%) thereof on a wet base in a measuring mode 96 (monitoring time: 2.5 min/variation range: 0.05%). The solid concentration of the emulsion was calculated according to the following formula:

Solid concentration(%)=100−$M$ wherein M is a water content (%) on a wet base which is represented by the formula: [(W−W₀)/W]×100 wherein W is a weight of the sample before measurement (initial weight of the sample); and W₀ is a weight of the sample after measurement (absolute dry weight).

[Particle Sizes of Toner]

Measuring Apparatus: Coulter Multisizer II (commercially available from Beckman Coulter Inc.)

Aperture Diameter: 50 μm

Analyzing Software: Coulter Multisizer AccuComp Ver. 1.19 (commercially available from Beckman Coulter Inc.)

Electrolyte Solution: "Isotone II" (commercially available from Beckman Coulter Inc.)

Dispersing Solution: The dispersing solution was prepared by dissolving "EMULGEN 109P" (commercially available from Kao Corporation; polyoxyethylene lauryl ether; HLB: 13.6) in the above electrolyte solution such that the concentration of "EMULGEN 109P" in the obtained solution was 5% by weight.

Dispersing Conditions: Ten milligrams of a sample to be measured was added to 5 mL of the dispersing solution, and dispersed using an ultrasonic disperser for 1 min. Thereafter, 25 mL of the electrolyte solution was added to the dispersion, and the obtained mixture was further dispersed using the ultrasonic disperser for 1 min to prepare a sample dispersion.

Measuring Conditions: The thus prepared sample dispersion was added to 100 mL of the electrolyte solution, and after controlling a concentration of the resultant dispersion such that the determination for particle sizes of 30000 particles was completed within 20 s, the particle sizes of 30000 particles were measured under the above concentration condition, and a volume-median particle size ($D_{50}$) thereof was determined from the thus measured particle size distribution.

[Content of Surfactants in Resin Emulsion]

The content of surfactants in the resin emulsion was quantitatively determined by the following ¹H-NMR method. That is, 0.3 g of the solid obtained by freeze-drying the resin emulsion by the above-mentioned method to remove the solvent therefrom was dissolved in 5 mL of chloroform, and then 5 mL of heavy water was added to the resulting solution to extract the surfactants into a water phase. Then, TSP was added as an internal standard to the water phase, and the resulting mixture was subjected to measurement of ¹H-NMR to determine contents of the surfactants therein. The NMR measurement was carried out using "FT-NMR MERCURY 400" available from Variant Inc.

[Heat-Resistant Storage Property of Toner]

Ten grams of a toner was charged into a 20-mL polymer bottle, and allowed to stand under environmental conditions of a temperature of 50° C. and a relative humidity of 40% RH for 48 h with the bottle being kept opened. Thereafter, the toner was measured for its aggregating degree using a powder tester available from Hosokawa Micron Corporation, to evaluate a heat-resistant storage property thereof according to the following ratings. The results are shown in Table 3. Meanwhile, the measurement of the aggregating degree using the powder tester was conducted as follows.

On a vibrating table of the powder tester, three sieves having different mesh sizes of 250 μm, 149 μm and 74 μm were respectively set to an upper stage, an intermediate stage and a lower stage of the tester in this order, and 2 g of the toner were placed on the upper stage sieve and vibrated to measure a weight of the toner as a reside on the respective sieves.

The aggregating degree (%) of the toner was determined from the thus measured weights of the toner according to the following formula. The smaller the numeral value of the aggregating degree, the more excellent the heat-resistant storage property of the toner.

Aggregating Degree(%)=a+b+c wherein a=[(weight of residual toner on the upper stage sieve)/2 (g)]×100; b =[(weight of residual toner on the intermediate stage sieve)/2 (g)]×100×(3/5); and c=[(weight of residual toner on the lower stage sieve)/2 (g)]×100×(1/5).

Evaluation Criteria

A: Aggregating degree was less than 10;
B: Aggregating degree was not less than 10 but less than 20; and
C: Aggregating degree was not less than 20.

Production Example 1

Production of Polyester A

A four-necked flask equipped with a nitrogen inlet tube, a dehydration tube, a stirrer and a thermocouple was charged with 1750 g of polyoxypropylene (2.2)-2,2-bis(4-hydroxyphenyl)propane, 1625 g of polyoxyethylene (2.0)-2,2-bis(4-hydroxyphenyl)propane, 945 g of terephthalic acid, 134 g of dodecenylsuccinic anhydride, 396 g of trimellitic anhydride and 24 g of tin dioctylate, and the contents of the flask were reacted with each other at 230° C. under a nitrogen atmosphere while stirring until the softening point as measured according to ASTM D36-86 reached 120° C., thereby obtaining a polyester resin A. A glass transition point, a softening temperature (Ts), a softening point (T1/2) and an acid value of the thus obtained polyester A are shown in Table 1. One kilogram of the obtained polyester A was placed on a sieve having an opening diameter of 5.6 mm according to JIS Z 8801 and shaken thereon. As a result, it was confirmed that no polyester remained on the sieve.

Production Examples 2 to 5

Production of Polyesters B to F

The same procedure as in Production Example 1 was repeated except that the amounts of the raw monomers used were varied according to the formulation as shown in Table 1, and then these monomers were reacted with each other until the softening point as measured according to ASTM D36-86 reached a desired temperature, thereby obtaining polyesters B to F having properties as shown in Table 1. A glass transition point, a softening point (T1/2), a softening temperature (Ts) and an acid value of each of the thus obtained polyesters are shown in Table 1. One kilogram of each of the obtained polyesters B to F was placed on a sieve having an opening diameter of 5.6 mm according to JIS Z 8801 and shaken thereon. As a result, it was confirmed that none of the polyesters remained on the sieve.

TABLE 1

|  | Polyesters | | | | | |
|---|---|---|---|---|---|---|
|  | A | B | C | D | E | F |
| Amounts of raw materials charged (g) | | | | | | |
| Bisphenol A-PO adduct | 1750 | 525 | 2450 | 525 | 3374 | 35 |
| Bisphenol A-EO adduct | 1625 | 1950 | 975 | 1950 | 33 | 3218 |

TABLE 1-continued

|  | Polyesters | | | | | |
| --- | --- | --- | --- | --- | --- | --- |
|  | A | B | C | D | E | F |
| Glycerol | 0 | 184 | 0 | 138 | 0 | 92 |
| Terephthalic acid | 945 | 1660 | 1529 | 1552 | 672 | 1693 |
| Dodecenylsuccinic anhydride | 134 | 0 | 0 | 0 | 0 | 0 |
| Fumaric acid | 0 | 0 | 0 | 0 | 696 | 0 |
| Trimellitic anhydride | 396 | 0 | 209 | 0 | 0 | 0 |
| Tin dioctylate | 24 | 21 | 0 | 21 | 0 | 25 |
| Dibutyl tin oxide | 0 | 0 | 15 | 0 | 15 | 0 |
| Trivalent or higher-valent component | | | | | | |
| Trivalent or higher-valent acid component in acid components (mol %) | 25 | 0 | 11 | 0 | 0 | 0 |
| Trivalent or higher-valent alcohol component in alcohol components (mol %) | 0 | 20 | 0 | 16 | 0 | 10 |
| Trivalent or higher-valent components in whole constituting components (mol %) | 11 | 10 | 5 | 8 | 0 | 5 |
| Properties of resin | | | | | | |
| Acid value (mgKOH/g) | 21 | 21.6 | 26.5 | 21.4 | 24.4 | 13.9 |
| Softening temperature (Ts) (° C.) | 81.5 | 84.8 | 93.9 | 87.7 | 80.1 | 73.8 |
| Softening point (T1/2) (° C.) | 122.1 | 123.2 | 124.9 | 121.3 | 107.1 | 107.4 |
| Glass transition point (° C.) | 64.5 | 71 | 76.7 | 72.7 | 65.4 | 64.5 |

Example 1

Production of Resin Emulsion A (a) Mixing Step

Three hundred grams of the polyester A, 3 g of a nonionic surfactant "EMULGEN 150" (polyoxyethylene lauryl ether (EO added: 40 mol); cloud point: 100° C. or higher; HLB: 18.4) available from Kao Corporation, 18.5 g of an anionic surfactant "NEOPELEX G-65" (sodium dodecylbenzenesulfonate; solid content: 65% by weight; water content: 35% by weight) available from Kao Corporation, 66 g of deionized water and 23 g of a quinacridone pigment "ECR-186Y" available from Dainichiseika Color & Chemicals Mtg. Co., Ltd., were melted and mixed together at 105° C. in a 5 L stainless steel flask while stirring with a paddle-shaped stirrer at a rate of 150 r/min.

(b) Neutralizing Step

Next, the contents of the flask were stabilized at 95° C. as the temperature lower, by 10° C. or more, than a softening point (T1/2) of the polyester. Thereafter, while stirring the resulting mixture with a paddle-shaped stirrer at a rate of 150 r/min, 126 g of a potassium hydroxide aqueous solution (concentration: 5% by weight; an amount required for neutralizing 100% of the polyester A) was dropped into the mixture at a feed rate of 3 g/min.

(c) Emulsifying Step

Successively, while stirring the resulting mixture with a paddle-shaped stirrer at a rate of 150 r/min, 510 g of deionized water was dropped to the mixture at a feed rate of 3 g/min. During the dropping, the temperature of the system was maintained at 95° C. Then, the obtained reaction mixture was passed through a wire mesh having a 200 mesh screen (mesh size: 105 μm) to obtain a resin emulsion A containing the polyester A. As a result, it was confirmed that the emulsified particles contained in the thus obtained resin emulsion had a volume-median particle size of 0.13 μm, a CV value of 28 and a solid concentration of 31% by weight, and no resin components remained on the wire mesh. Other properties of the obtained resin emulsion A are shown in Table 2.

Examples 2, 4 and 6

Production of Resin Emulsions B, D and F

The same procedure as in Example 1 was repeated except that the amounts of the polyester, nonionic surfactant, anionic surfactant, quinacridone pigment, potassium hydroxide aqueous solution and deionized water used were changed as shown in Table 2, thereby obtaining resin emulsions B, D and F. As a result, it was confirmed that no resin components remained on the wire mesh. Various properties of the thus obtained resin emulsions B, D and F are shown in Table 2.

Examples 3 and 5

Production of Resin Emulsions C and E

The same procedure as in Example 1 was repeated except that the respective polyesters as shown in Table 2 were used, and "EMULGEN 430" (polyoxyethylene oleyl ether (EO added: 30 mol); cloud point: 100° C. or higher; HLB: 16.2) available from Kao Corporation was used as the nonionic surfactant, thereby obtaining resin emulsions C and E. Various properties of the thus obtained resin emulsions C and E are shown in Table 2.

Comparative Example 1

Production of Resin Emulsion G

The same procedure as in Example 1 was repeated except that the amounts of the nonionic surfactant, anionic surfactant and deionized water used were changed as shown in Table 2, thereby attempting to obtain a resin emulsion G. However, no emulsion was produced. When the obtained mixture was passed through a wire mesh having a 200 mesh screen (mesh size: 105 μm), a majority of the resin components remained on the wire mesh.

Comparative Example 2

Production of Resin Emulsion H

The same procedure as in Example 1 was repeated except that the amounts of the nonionic surfactant, anionic surfactant and deionized water used were changed as shown in Table 2, thereby obtaining a resin emulsion H. Various properties of the thus obtained resin emulsion H are shown in Table 2.

Production Example 7

Production of Resin Emulsion I

One hundred and five grams of the polyester A, 195 g of the polyester E, 3 g of a nonionic surfactant "EMULGEN 430" (polyoxyethylene oleyl ether (EO added: 30 mol); cloud point: 100° C. or higher; HLB: 16.2) available from Kao Corporation, 20 g of an anionic surfactant "NEOPELEX G-15" (sodium dodecylbenzenesulfonate; solid content: 15% by weight; water content: 85% by weight) available from Kao Corporation, 23 g of a quinacridone pigment "ECR-186Y" available from Dainichiseika Color & Chemicals Mtg. Co., Ltd., and 138 g of a potassium hydroxide aqueous solution (concentration: 5% by weight; an amount required for neutralizing 100% of the polyester A) as a neutralizing agent were dispersed at 95° C. in a 5 L stainless steel flask while stirring with a paddle-shaped stirrer at a rate of 200 r/min. The contents of the stainless steel flask were continuously stirred for 2 h even after reaching 95° C. Thereafter, while stirring the resulting mixture with a paddle-shaped stirrer at a rate of 200 r/min, 568 g of deionized water was dropped into the mixture at a feed rate of 3 g/min. Then, the obtained mixture was passed through a wire mesh having a 200 mesh screen (mesh size: 105 μm) to obtain a resin emulsion I containing the polyesters A and E. As a result, it was confirmed that no resin components remained on the wire mesh. Other properties of the obtained resin emulsion I are shown in Table 2.

Production Example 8

Production of Releasing Agent Dispersion A

After 3.57 g of an aqueous solution of dipotassium alkenyl succinate "LATEMUL ASK" (concentration of effective ingredients: 28%) available from Kao Corp., was dissolved in 400 g of deionized water in a 1 L beaker, 100 g of a carnauba wax (melting point: 85° C.) available from S. Kato & Co., was dispersed in the resultant solution. While maintaining the obtained dispersion at a temperature of 90 to 95° C., the dispersion was subjected to dispersing treatment for 30 min by using "Ultrasonic Homogenizer 600W" available from Nippon Seiki Co., Ltd., thereby obtaining a releasing agent dispersion A. The releasing agent contained in the resulting releasing agent dispersion A had a volume median particle size ($D_{50}$) of 0.45 μm, a CV value of 31 and a solid content of 24% by weight.

TABLE 2-1

| | Examples | | | | |
|---|---|---|---|---|---|
| | 1 | 2 | 3 | 4 | 5 |
| Resin emulsion | A | B | C | D | E |
| Amounts charged (g) | | | | | |
| Polyester A | 300 | — | 105 | — | — |
| Polyester B | — | 300 | — | — | — |
| Polyester C | — | — | — | 300 | — |
| Polyester D | — | — | — | — | 105 |
| Polyester E | — | — | 195 | — | — |
| Polyester F | — | — | — | — | 195 |
| Nonionic surfactant | 3 | 3 | 3 | 3 | 3 |
| Anionic surfactant | 18.5 | 13.8 | 18.5 | 13.8 | 18.5 |
| Quinacridone pigment | 23 | 23 | 23 | 23 | 23 |
| 5 wt % KOH aqueous solution | 126 | 130 | 139 | 159 | 99 |
| Water (mixing step) | 66 | 60 | 69 | 51 | 69 |
| Water (emulsifying step) | 510 | 521 | 493 | 498 | 532 |
| Trivalent crosslinked monomer component in resin (mol %) | 11 | 10 | 4 | 5 | 6 |
| Content | | | | | |
| Nonionic surfactant[1] | 1.0 | 1.0 | 1.0 | 1.0 | 1.0 |
| Anionic surfactant[1] | 4.0 | 3.0 | 4.0 | 3.0 | 4.0 |
| Weight ratio of nonionic surfactant/anionic surfactant | 0.25 | 0.33 | 0.25 | 0.33 | 0.25 |
| Solid content in resin emulsion (wt %) | 31 | 30 | 32 | 31 | 31 |
| Emulsified resin particles | | | | | |
| Volume-median particle size ($D_{50}$) (μm) | 0.130 | 0.279 | 0.165 | 0.193 | 0.135 |
| CV value | 28 | 29 | 33 | 35 | 28 |
| Softening point ($T_{1/2}$) (° C.) | 116.9 | 121.5 | 116.0 | 116.5 | 116.9 |
| Glass transition point (° C.) | 61.6 | 64.7 | 64.6 | 72.1 | 64.0 |

Note
[1]Part(s) by weight of the respective surfactants on the basis of 100 parts by weight of the resin

TABLE 2-2

| | Example 6 | Comparative Example 1 | Comparative Example 2 | Production Example 7 |
|---|---|---|---|---|
| Resin emulsion | F | G | H | I |
| Amounts charged (g) | | | | |
| Polyester A | 300 | 300 | 300 | 105 |
| Polyester B | — | — | — | — |
| Polyester C | — | — | — | — |
| Polyester D | — | — | — | — |
| Polyester E | — | — | — | 195 |
| Polyester F | — | — | — | — |
| Nonionic surfactant | 2 | 0 | 30 | 3 |
| Anionic surfactant | 18.5 | 14 | 23 | 20 |
| Quinacridone pigment | 23 | 23 | 23 | 23 |
| 5 wt % KOH aqueous solution | 126 | 126 | 126 | 138 |
| Water (mixing step) | 66 | 80 | 0 | 0 |
| Water (emulsifying step) | 512 | 575 | 580 | 568 |
| Trivalent crosslinked monomer component in resin (mol %) | 11 | 11 | 11 | 4 |
| Content | | | | |
| Nonionic surfactant[1] | 0.5 | 0.0 | 10.0 | 1.0 |
| Anionic surfactant[1] | 4.0 | 3.0 | 5.0 | 1.0 |
| Weight ratio of nonionic surfactant/anionic surfactant | 0.13 | 0 | 2 | 1.0 |

TABLE 2-2-continued

| | Example 6 | Comparative Example 1 | Comparative Example 2 | Production Example 7 |
|---|---|---|---|---|
| Solid content in resin emulsion (wt %) | 30 | — | 33 | 31 |
| Emulsified resin particles | | | | |
| Volume-median particle size ($D_{50}$) (μm) | 0.103 | — | 0.092 | 0.152 |
| CV value | 28 | — | 20 | 26 |
| Softening point ($T\frac{1}{2}$) (° C.) | 110.5 | — | 92.5 | 102.8 |
| Glass transition point (° C.) | 59.4 | — | 35.9 | 59.8 |

Example 7

1. Production of Toner Mother Particles (1) Aggregating Step

Two hundred grams of the resin emulsion A obtained in Example 1, 15 g of the releasing agent dispersion A and 52 g of deionized water were charged into a 2 L flask. Next, 253 g of an ammonium sulfate aqueous solution (0.45 mol/L) was dropped into the flask at room temperature over 30 min while stirring with a paddle-shaped stirrer at a rate of 100 r/min. Thereafter, the resultant dispersion was heated at a temperature rise rate of 0.16° C./min while stirring to allow growth of aggregated particles. The dispersion was heated until reaching 57° C. at which the temperature was fixed, and then allowed to stand at 57° C. for 5 h. After thus forming the aggregated particles, a dilute solution prepared by diluting 4.2 g of a sodium polyoxyethylenedodecylethersulfate aqueous solution (solid content: 28% by weight) with 37 g of deionized water was added thereto.

(2) Coalescing Step

Thirty minutes after adding the dilute solution to the aggregated particles obtained in the aggregating step (1), the resultant dispersion was heated to 80° C. at a rate of 0.16° C./min and maintained at 80° C. for 1 h from the time at which the temperature of the dispersion reached 80° C., and then the heating was stopped. The obtained dispersion was gradually cooled to room temperature, and then subjected to a suction filtration step, a washing step and a drying step to obtain toner mother particles.

2. Production of Toner

Next, 1.0 part by weight of a hydrophobic silica ("R972" commercially available from Nippon Aerogel Corp.; number-average particle size: 16 nm) was externally added to 100 parts by weight of the toner mother particles using a Henschel mixer to obtain a cyan toner. The obtained toner had a volume-median particle size ($D_{50}$) of 4.8 μm. The heat-resistant storage property of the obtained toner was evaluated by the above-mentioned method. The results are shown in Table 3.

Examples 8 to 12 and Comparative Example 3

The same procedure as in Example 7 was repeated except that the resin emulsion used was changed as shown in Table 3, thereby obtaining toner mother particles and then obtaining a toner therefrom. The thus obtained toner was subjected to evaluation of a heat-resistant storage property thereof by the same method as described above. The evaluation results of the toner are shown together with a volume-median particle size ($D_{50}$) thereof in Table 3.

Example 13

1. Production of Toner Mother Particles (1) Aggregating Step
(a) Preparation of Core Particles Two hundred grams of the resin emulsion A, 15 g of the releasing agent dispersion A and 52 g of deionized water were charged into a 2 L flask. Next, 253 g of a 0.45 mol/L ammonium sulfate aqueous solution was dropped into the flask at room temperature over 30 min while stirring with a paddle-shaped stirrer at a rate of 100 r/min. Thereafter, the resultant dispersion was heated at a temperature rise rate of 0.16° C./min while stirring to form aggregated particles. The resulting dispersion was heated until reaching 57° C. at which the temperature was fixed, and then allowed to stand at 57° C. for 3 h, thereby obtaining aggregated particles (core particles).

(b) Addition of Shell Particles

While maintaining the aggregated particles obtained in the above step (1) at a temperature of 57° C., a mixed solution containing 200 g of the resin emulsion H and 52 g of deionized water was dropped thereto at a rate of 1 g/min. Thirty minutes after completion of the dropping, a dilute solution prepared by diluting 4.2 g of a sodium polyoxyethylenedodecylethersulfate aqueous solution (solid content: 28% by weight) with 37 g of deionized water was added thereto.

(2) Coalescing Step

Thirty minutes after adding the dilute solution, the resultant dispersion was heated to 80° C. at a rate of 0.16° C./min and maintained at 80° C. for 1 h from the time at which the temperature of the dispersion reached 80° C., and then the heating was stopped.

The obtained dispersion was gradually cooled to room temperature, and then subjected to a suction filtration step, a washing step and a drying step to obtain toner mother particles.

2. Production of Toner

Next, 1.0 part by weight of a hydrophobic silica ("R972" commercially available from Nippon Aerogel Corp.; number-average particle size: 16 nm) was externally added to 100 parts by weight of the toner mother particles using a Henschel mixer to obtain a cyan toner. The obtained toner had a volume-median particle size ($D_{50}$) of 5.0 μm. The heat-resistant storage property of the obtained toner was evaluated by the above-mentioned method. The results are shown in Table 3.

TABLE 3

| | Resin emulsion used for production of toner | Volume-median particle size ($D_{50}$) of toner (μm) | Storage property of toner |
|---|---|---|---|
| Example 7 | A | 4.8 | B |
| Example 8 | B | 4.8 | A |
| Example 9 | C | 4.7 | B |
| Example 10 | D | 5.1 | A |
| Example 11 | E | 5.0 | A |
| Example 12 | F | 4.9 | B |
| Example 13 | A + I | 5.1 | A |
| Comparative Example 3 | H | 4.9 | C |

INDUSTRIAL APPLICABILITY

The resin emulsion of the present invention exhibits a good emulsification performance and is capable of producing a toner having an excellent heat-resistant storage property, and therefore can be suitably used for production of a toner for electrophotography which is employed in electrophotographic method, electrostatic recording method, electrostatic printing method, etc.

BRIEF DESCRIPTION OF THE DRAWING

FIG. 1 is a graphic view showing a relationship between a temperature and a downward movement of a plunger of a flow tester as measured using the flow tester.

The invention claimed is:

1. A process for producing a resin emulsion, comprising:
   (a) mixing a resin comprising a polyester having at least one constitutional unit selected from the group consisting of a constitutional unit derived from a trivalent or higher-valent alcohol component and a constitutional unit derived from a trivalent or higher-valent carboxylic acid component, an anionic surfactant, a nonionic surfactant and an aqueous medium with each other at a temperature not lower than a softening temperature (Ts) of the resin as measured by a flow tester method, the nonionic surfactant and the aqueous medium being used in amounts of from 0.1 to 1.0 part by weight and from 10 to 50 parts by weight, respectively, on the basis of 100 parts by weight of the resin; and
   (b) neutralizing a mixture obtained in (a) with a basic compound in an aqueous medium at a temperature not higher than a softening point (T1/2) of the resin as measured by a flow tester method, wherein
   the basic compound is added in (b) without addition thereof in (a), and
   the total content of the constitutional unit derived from the trivalent or higher-valent alcohol component and the constitutional unit derived from the trivalent or higher-valent carboxylic acid component is 5 to 10 mole % of the polyester.

2. The process according to claim 1, wherein an amount of the anionic surfactant mixed in (a) is from 0.1 to 5 parts by weight on the basis of 100 parts by weight of the resin.

3. A resin emulsion produced by the process as defined in claim 1.

4. A toner for electrophotography, comprising the resin emulsion as defined in claim 3.

5. A process for producing a toner for electrophotography, comprising:
   (1) producing a resin emulsion by the process as defined in claim 1; and
   (2) aggregating and coalescing emulsified particles contained in the resin emulsion obtained in (1).

6. The process according to claim 5, wherein upon aggregation in (2), additional fine emulsified resin particles are added to the emulsified particles contained in the resin emulsion obtained in (1).

7. A toner for electrophotography produced by the process as defined in claim 6.

8. A toner for electrophotography produced by the process as defined in claim 5.

9. An electrophotographic method, comprising carrying out said method using the toner as defined in claim 8.

10. A resin emulsion comprising a binder resin comprising a polyester having at least one constitutional unit selected from the group consisting of a constitutional unit derived from a trivalent or higher-valent alcohol component and a constitutional unit derived from a trivalent or higher-valent carboxylic acid component, a nonionic surfactant, an anionic surfactant and an aqueous medium, wherein emulsified particles contained in the resin emulsion have a softening point (T1/2) of from 105 to 155° C. as measured by a flow tester method, and a content of the nonionic surfactant in the resin emulsion is from 0.1 to 1.0 part by weight on the basis of 100 parts by weight of the binder resin, wherein
the total content of the constitutional unit derived from the trivalent or higher-valent alcohol component and the constitutional unit derived from the trivalent or higher-valent carboxylic acid component is 5 to 10 mole % of the polyester.

11. The resin emulsion according to claim 10, wherein the polyester has a constitutional unit derived from a trivalent or higher-valent alcohol component.

12. The resin emulsion according to claim 11, wherein the content of the constitutional unit derived from the trivalent or higher-valent alcohol component is 5 to 35 mol % of all constitutional units derived from alcohols.

13. The resin emulsion according to claim 10, wherein the polyester has a constitutional unit derived from a trivalent or higher-valent acid component.

14. The resin emulsion according to claim 13, wherein the content of the constitutional unit derived from the trivalent or higher-valent carboxylic acid component is 6 to 35 mol % of all constitutional units derived from alcohols.

15. The resin emulsion according to claim 10, wherein the polyester has a constitutional unit derived from a trivalent or higher-valent alcohol component and a constitutional unit derived from a trivalent or higher-valent carboxylic acid component.

16. The resin emulsion according to claim 15, wherein the content of the constitutional unit derived from the trivalent or higher-valent alcohol component is 5 to 35 mol % of all constitutional units derived from alcohols, and the content of the constitutional unit derived from the trivalent or higher-valent carboxylic acid component is 6 to 35 mol % of all constitutional units derived from carboxylic acids.

17. The resin emulsion according to claim 10, wherein the resin comprises a first polyester having a softening point (T1/2) in the range of from 70° C. to 115° C.; and a second polyester having a softening point (T1/2) in the range of from 115° C. to 165° C.

18. The resin emulsion according to claim 17, wherein a weight ratio of the first polyester to the second polyester is from 10/90 to 90/10.

19. A resin emulsion produced by emulsifying a binder resin comprising a polyester having at least one constitutional unit selected from the group consisting of a constitutional unit derived from a trivalent or higher-valent alcohol component and a constitutional unit derived from a trivalent or higher-valent carboxylic acid component, in an aqueous medium in the presence of a nonionic surfactant and an anionic surfactant, wherein emulsified particles contained in the resin emulsion have a softening point (T1/2) of from 105 to 155° C. as measured by a flow tester method, and a content of the nonionic surfactant in the resin emulsion is from 0.1 to 1.0 part by weight on the basis of 100 parts by weight of the binder resin, wherein
the total content of the constitutional unit derived from the trivalent or higher-valent alcohol component and the constitutional unit derived from the trivalent or higher-valent carboxylic acid component is 5 to 10 mole % of the polyester.

* * * * *